United States Patent
Kim

(10) Patent No.: US 10,203,661 B2
(45) Date of Patent: Feb. 12, 2019

(54) SYSTEMS AND METHODS FOR PERFORMING SELF-INTERFERENCE INCOHERENT DIGITAL HOLOGRAPHY

(71) Applicant: UNIVERSITY OF SOUTH FLORIDA, Tampa, FL (US)

(72) Inventor: Myung K. Kim, Tampa, FL (US)

(73) Assignee: University of South Florida, Tampa, FL (US)

( * ) Notice: Subject to any disclaimer, the term of this patent is extended or adjusted under 35 U.S.C. 154(b) by 108 days.

(21) Appl. No.: 15/100,385

(22) PCT Filed: Jul. 8, 2015

(86) PCT No.: PCT/US2015/039479
§ 371 (c)(1),
(2) Date: May 31, 2016

(87) PCT Pub. No.: WO2016/007579
PCT Pub. Date: Jan. 14, 2016

(65) Prior Publication Data
US 2017/0108829 A1   Apr. 20, 2017

Related U.S. Application Data

(60) Provisional application No. 62/022,782, filed on Jul. 10, 2014.

(51) Int. Cl.
*G03H 1/04* (2006.01)
*G03H 1/00* (2006.01)
(Continued)

(52) U.S. Cl.
CPC .......... *G03H 1/041* (2013.01); *G03H 1/0005* (2013.01); *G03H 1/0443* (2013.01); *G03H 1/06* (2013.01);
(Continued)

(58) Field of Classification Search
CPC .... G03H 1/041; G03H 1/0005; G03H 1/0443; G03H 1/06; G03H 1/22; G03H 5/00;
(Continued)

(56) References Cited

U.S. PATENT DOCUMENTS

| 3,515,452 A | 6/1970 | Pole |
| 4,067,638 A | 1/1978 | Yano |

(Continued)

FOREIGN PATENT DOCUMENTS

| EP | 1782108 B1 | 2/2011 |
| WO | 2007115281 A1 | 10/2007 |

(Continued)

OTHER PUBLICATIONS

Eisebitt, et al. "Lenseless imaging of magnetic nanostructure by x-ray spectral-holography", Nature 432, 885, 2004.

(Continued)

*Primary Examiner* — Jennifer D. Carruth
(74) *Attorney, Agent, or Firm* — Thomas | Horstemeyer, LLP

(57) ABSTRACT

In one embodiment, a self-interference incoherent digital holography system including a light sensor and a diffractive filter configured to receive light from an object to be holographically imaged and generate holographic interference patterns on the light sensor. A self-interference incoherent digital holography system comprising: a light sensor; and a diffractive filter configured to receive light from an object to be holographically imaged and generate holographic interference patterns on the sensor.

16 Claims, 3 Drawing Sheets

(51) Int. Cl.
G03H 1/06 (2006.01)
G03H 1/22 (2006.01)
G03H 5/00 (2006.01)

(52) U.S. Cl.
CPC .............. *G03H 1/22* (2013.01); *G03H 5/00* (2013.01); *G03H 2001/005* (2013.01); *G03H 2001/0428* (2013.01); *G03H 2001/0441* (2013.01); *G03H 2001/0447* (2013.01); *G03H 2001/0452* (2013.01); *G03H 2210/44* (2013.01); *G03H 2222/14* (2013.01); *G03H 2223/23* (2013.01); *G03H 2223/52* (2013.01); *G03H 2226/11* (2013.01)

(58) Field of Classification Search
CPC ..... G03H 2001/005; G03H 2001/0428; G03H 2001/0441; G03H 2001/0452; G03H 2210/44; G03H 2222/14; G03H 2223/23; G03H 2223/52
See application file for complete search history.

(56) References Cited

U.S. PATENT DOCUMENTS

| | | | |
|---|---|---|---|
| 4,783,133 A | 11/1988 | Chen | |
| 5,022,727 A | 6/1991 | Smith et al. | |
| 5,493,398 A | 2/1996 | Pfister | |
| 5,822,066 A | 10/1998 | Jeong et al. | |
| 5,880,834 A | 3/1999 | Chrisp | |
| 5,910,839 A | 6/1999 | Erskine | |
| 5,946,077 A | 8/1999 | Nemirovskiy | |
| 6,437,914 B1* | 8/2002 | Hall, Jr. ........... | G02B 5/32 348/781 |
| 7,962,033 B2 | 6/2011 | Georgiev | |
| 7,978,386 B2 | 7/2011 | Purvis | |
| 8,265,478 B1 | 9/2012 | Georgiev | |
| 8,345,144 B1 | 1/2013 | Georgiev et al. | |
| 8,400,555 B1 | 3/2013 | Georgiev et al. | |
| 9,360,299 B1 | 6/2016 | Kim | |
| 9,377,758 B1 | 6/2016 | Kim | |
| 9,417,610 B1 | 8/2016 | Kim | |
| 2005/0058910 A1* | 3/2005 | Takizawa ........... | G03F 7/001 430/1 |
| 2005/0129082 A1 | 6/2005 | Poppe et al. | |
| 2006/0132799 A1 | 6/2006 | Dubois et al. | |
| 2008/0137933 A1 | 6/2008 | Kim | |
| 2009/0041448 A1 | 2/2009 | Georgiev et al. | |
| 2010/0142014 A1 | 6/2010 | Rosen | |
| 2012/0200901 A1 | 8/2012 | Dubois | |
| 2012/0281072 A1 | 11/2012 | Georgiev et al. | |

FOREIGN PATENT DOCUMENTS

| | | |
|---|---|---|
| WO | 2012150472 A1 | 11/2012 |
| WO | 2013086350 A1 | 6/2013 |

OTHER PUBLICATIONS

MK Kim, "Incohernt digital holographic adaptive optics", Appl, Opt. 52, A117-A-130, 2013.
MK Kim, "Full color natural light holographic camera", Opt Express 21, 9636-9642, 2013.
Hong, et al., "Single-shot self-interference incoherent digital holography using off-axis configuration", Opt. Lett 38, 5196-5199, 2013.
Streubel, et al., "Magnetic microstructure of rolled-up single-layer ferromagnetic nanomembranes", Adv. Mater, 26 316, 2014.
Chao, et al., "Real space soft x-ray imaging at 10nm spatial resolutin", Opt. Express 20, 9777, 2012.
Rosen, Joseph, "Digital Spatially incoherent frensel holography", Optics Letters, vol. 32, No. 8, 2007.
Rosen, et al., "Fluorescence incoherent color holography", Optics express, vol. 15, No. 5; 2007.
Sirat, et al., "Conoscopic holography", CA Institute of Techology, Optic Letters, vol. 10, No. 1, 1985.
J. Rosen, N. Siegel, G. Brooker, Theoretical and experimental demonstration of resolution beyond the Rayleigh limit by FINCH fluorescence microscopic imaging. Optics Express 19, 27, 26249-26268 (Dec. 19, 2011).
H. W. Babcock, The possibility of compensating astronomical seeing. Publications of the Astronomical Society of the Pacific 65, 386, 229-236 (1953).
H. W. Babcock, Adaptive optics revisited, Science 249, 253-257 (1990).
J. W. Hardy, Adaptive Optics for Astronomical Telescopes 112-231 (Oxford University, 1998).
J. Porter, Adaptive Optics for Vision Science: Principles, Practices, Design, and Applications (Wiley, 2006).
S. Avino, E Calloni, J. T. Baker, F. Barone, R. DeRosa, L. DiFiore, L. Milano, and S. R. Restaino, First adaptive optics control of laser beam based on interferometric phase-front detection. Review of Scientific Instruments 76, 083119, 083119-1 to 083119-4 (2005).
M. C. Roggemann, B. M. Welsh, and R. Q. Fugate, Improving the resolution of ground-based telescopes. Rev. Mod. Phys. 69, 2, 437-506 (1997).
C. G. Liu and M. K. Kim, Digital holographic adaptive optics for ocular imaging: proof of principle, Optics Letters 36, 14, 2710-2712 (2011).
M. K. Kim, Digital Holographic Microscopy: Principles, Techniques, and Applications, 248 pages (Springer, 2011).
M. K. Kim, Principles and techniques of digital holographic microscopy. SPIE Rev. 1, 018005, 51 pages (2010).
J. Upatnieks, A. V. Lugt, and E. N. Leith, Correction of lens aberrations by means of holograms. Appl. Opt. 5, 4, 589-593 (1966).
R. A. Fisher, Optical Phase Conjugation, 29 pages (Academic, 1983).
A. V. Lugt, Signal detection by complex spatial filtering. IEEE Transactions on Information Theory 10, 139-145 (1964).
J. Kuhn, F. Charriere, T. Colomb, E. Cuche, F. Montfort, Y. Emery, P. Marquet, and C. Depeursinge, Axial subnanometer accuracy in digital holographic microscopy. Measurement Science and Technology 19, 074007, 1-8 (2008).
B. Rappaz, A. Barbul, F. Charriere, J. Kuhn, P. Marquet, R. Korenstein, C. Depeursinge, and P. J. Magistretti, Erythrocytes analysis with a digital holographic microscope. Proc. SPIE 6631, 66310H, 7 pages (2007).
C. J. Mann, L. F. Yu, C.M. Lo, and M. K. Kim, High-resolution quantitative phase-contrast microscopy by digital holography. Optics Express 13, 22, 8693-8698 (2005).
L. Miccio, D. Alfieri, S. Grilli, P. Ferraro, A. Finizio, L. De Petrocellis, and S. D. Nicola, Direct full compensation of the aberrations in quantitative phase microscopy of thin objects by a single digital hologram. Applied Physics Letters 90, 041104-1 to 041104-3 (2007).
T. Colomb, F. Montfort, J. Kuhn, N. Aspert, E. Cuche, A. Madan, F. Charriere, S. Bourquin, P. Marquet, and C. Depeursinge, Numerical parametric lens for shifting, magnification, and complete aberration compensation in digital holographic microscopy. J. Opt. Soc. Am. A 23, 12, 3177-3190 (2006).
B. Katz, D. Wulich, and J. Rosen, Optimal noise suppression in Fresnel incoherent correlation holography (FINCH) configured for maximum imaging resolution. Applied Optics 49, 5757-5763 (2010).
L. M. Mugnier, G. Y. Sirat, and D. Charlot, Conoscopic holography: two-dimensional numerical reconstructions. Optics Letters 18, 1, 66-68 (1993).
M. Levoy, Light fields and computational imaging. Computer 39, 46-55 (Aug, 2006).
G. Brooker, N. Siegel, V. Wang, and J. Rosen, Optimal resolution in Fresnel incoherent correlation holographic fluorescence microscopy. Optics Express 19, 5047-5062 (2011).
International Search Report and Written Opinion of Application No. PCT/US2014/039737 dated Nov. 19, 2014, 15 pages.
Adelson, et al., Single Lens Stereo with a Plenoptic Camera. IEEE transactions on pattern analysis and machine intelligence, vol. 14, No. 2, 99-106, Feb. 1992.

(56) References Cited

OTHER PUBLICATIONS

Stroke et al., Holography with spatially non coherent light. Applied Physics Letters 7, 229-231 (1965).

Lyalikov, Methods for achieving high measurement sensitivity in holographic interferometry by rewriting holograms using incoherent light. The American Institute of Physics, Technical Physics, vol. 44, No. 12, 1462-1466, Dec. 1999.

https://www.lytro.com/about, 1 page.

D. Gabor, A new microscope principle. Nature Publishing Group 161, 4098, 777-778 (1948).

D. Gabor, Microscopy by reconstructed wavefronts. Proc. Roy. Soc. A197, 454-487 (1949).

E. N. Leith, J. Upatnieks, Wavefront reconstruction with continuous-tone objects. Journal of the Optical Society of America 53, 12, 1377-1381 (1963).

E. N. Leith, J. Upatnieks, Wavefront reconstruction with diffused illumination and three-dimensional objects. Journal of the Optical Society of America 54, 11, 1295-1301 (1964).

S. A. Benton, Hologram Reconstructions with Extended Incoherent Sources. Journal of the Optical Society of America 59, 1544-1546 (1969).

S. A. Benton, Holographic displays—A Review. Optical Engineering, 14, 5, 402-407 (1975).

E. N. Leith, Upatniek.J, Holography with Achromatic-Fringe Systems. Journal of the Optical Society of America 57, 8, 975-980 (1967).

F. Dubois, L. Joannes, J. C. Legros, Improved three-dimensional imaging with a digital holography microscope with a source of partial spatial coherence. Applied Optics 38, 34, 7085-7094 (Dec. 1999).

G. Cochran, New Method of Making Fresnel Transforms with Incoherent Light. Journal of the Optical Society of America 56, 11, 1513-1517 (1966).

S. G. Kim B. Lee, E. S. Kim, Removal of bias and the conjugate image in incoherent on-axis triangular holography and real-time reconstruction of the complex hologram. Applied Optics 36, 20, 4784-4791 (Jul. 10, 1997).

G. Sirat, D. Psaltis, Conoscopic Holography. Optics Letters 10, 1, 4-6 (1985).

L. M. Mugnier, G. Y. Sirat, On-axis conoscopic holography without a conjugate image. Optics Letters 17, 4, 294-296 (1992).

T.-C.Poon, M. H. Wu, K. Shinoda, T. Suzuki, Optical scanning holography. Proceedings of the IEEE 84, 5, 753-764 (1996).

T. C. Poon, Optical Scanning Holography—A Review of Recent Progress. Journal of the Optical Society of Korea 13, 4, 406-415 (2009).

G. Popescu, T. Ikeda, R. R. Dasari, and M. S. Feld, Diffraction phase microscopy for quantifying cell structure and dynamics. Optics Letters 31(6), 775-777 (2006).

C. Iemmi, A. Moreno, J. Campos, Digital holography with a point diffraction interferometer. Optics Express 13, 6, 1885-1891 (Mar. 2005).

V. Micó, J. García, Z. Zalevsky, and B. Javidi, Phase-shifting Gabor holography. Optics Letters 34(10), 1492-1494 (2009).

J. Rosen, G. Brooker, Digital spatially incoherent Fresnel holography. Optics Letters 32, 8, 912-914 (Apr. 2007).

J. Rosen, G. Brooker, Fluorescence incoherent color holography. Optics Express 15, 5, 2244-2250 (Mar. 2007).

J. Rosen, G. Brooker, Non-scanning motionless fluorescence three-dimensional holographic microscopy. Nature Photonics 2, 190-195 (Mar. 2008).

M. K. Kim, Adaptive optics by incoherent digital holography. Optics Letters 37, 13, 2694-2696 (Jul. 1, 2012).

M. K. Kim, Incoherent digital holographic adaptive optics. Applied Optics 52, 1, A117-A130 (2013).

I. Yamaguchi, T. Zhang, Phase-shifting digital holography. Optics Letters 22, 16, 1268-1270 (Aug. 15, 1997).

J. Kato, I. Yamaguchi, T. Matsumura, Multicolor digital holography with an achromatic phase shifter. Optics Letters 27, 16, 1403-1405 (Aug. 2002).

\* cited by examiner

SYSTEMS AND METHODS FOR PERFORMING SELF-INTERFERENCE INCOHERENT DIGITAL HOLOGRAPHY

CROSS-REFERENCE TO RELATED APPLICATION

This application is the 35 U.S.C. § 371 national stage of, and claims priority to and the benefit of, PCT application PCT/US2015/039479, filed Jul. 8, 2015, which claims priority to and the benefit of U.S. Application No. 62/022,782, filed on Jul. 10, 2014, herein incorporated by reference in their entirety.

NOTICE OF GOVERNMENT-SPONSORED RESEARCH

This invention was made with Government support under grant/contract number R21 EY021876, awarded by the National Institutes of Health (NIH). The Government has certain rights in the invention.

BACKGROUND

Holographic imaging is well known for retrieving both the amplitude and phase information of the object. Ironically, although the use of coherent illumination led to the realization of viable holographic imaging, it also restricted the wide usage of the holographic imaging. The possibility of incoherent holography has been studied but it was not able to achieve the acceptable quality of hologram until recently. Through the development of digital electronic devices and computer science in the recent decade, many interesting techniques have been proposed to acquire holographic information under the incoherent illumination. One approach that uses the self-interference shows promise for practical applications. This approach separates the light from an object into two paths and causes beams from the same object point to interfere with each other. Unfortunately, the spatial incoherence of the light from the object washes out the fringe of the recorded intensity image. Because of this, the complex hologram must be computationally retrieved from multiple phase-shifted images.

Recently, the inventor reported successful achievement of holographic recording and reconstruction of a natural outdoor scene with a holographic camera based on the self-interference incoherent digital holography. The camera incorporates an interferometer having a linearly displaceable mirror that can be used for phase-shifting. Although the camera works well, the need for phase-shifting remains an issue that restricts the application. In particular, phase-shifting requires the object to be nearly stationary for multiple exposures, hence, the temporal resolution can be sacrificed and the camera may be inappropriate for high-speed imaging. Moreover, because the amount of phase-shifting varies according to the wavelength of the illumination source, a large number of exposures is required for full-color imaging.

Still more recently, the inventor replaced the linearly displaceable mirror with an off-axis mirror that enables the interferometer to introduce high-frequency fringes that encode the phase information in the interferogram. With this change, the holographic camera is capable of capturing a holographic image with a single exposure of a scene illuminated with incoherent light without the need for any moving parts. While this camera is an improvement of the phase-shifting camera, limitations still exist. For example, because the camera requires an interferometer, which includes a beam splitter and two mirrors, the camera requires a relatively large volume of space and therefore may be unsuitable for use in applications in which such space is limited. Furthermore, the camera requires a relatively large number of parts, which increases the cost and complexity of the camera. Moreover, it is difficult to construct an interferometer that operates well in certain regions of the electromagnetic spectrum, such as the x-ray spectrum.

From the above discussion, it can be appreciated that it would be desirable to have an alternative system and method for performing incoherent digital holography.

BRIEF DESCRIPTION OF THE DRAWINGS

The present disclosure may be better understood with reference to the following figures. Matching reference numerals designate corresponding parts throughout the figures, which are not necessarily drawn to scale.

FIG. 2 illustrates an example diffractive filter and its use.

DETAILED DESCRIPTION

As described above, it would be desirable to have an alternative system and method for performing incoherent digital holography. More particularly, it would be desirable to have a system and method that can create digital holographic images from incoherent light but that does not require multiple exposures or an interferometer. Described herein are examples of such systems and methods. In one embodiment, incoherent digital holography is performed by capturing a single exposure of an object using a system comprising a diffractive filter. The filter comprises two superposed Fresnel lenses having different focal lengths and a slight relative tilt (angular offset) that together generate holographic interference patterns on the image plane of a light sensor of the system. The holographic interference patterns can be numerically processed to reconstruct a holographic image of the object.

In the following disclosure, various specific embodiments are described. It is to be understood that those embodiments are example implementations of the disclosed inventions and that alternative embodiments are possible. All such embodiments are intended to fall within the scope of this disclosure.

Figure 1:
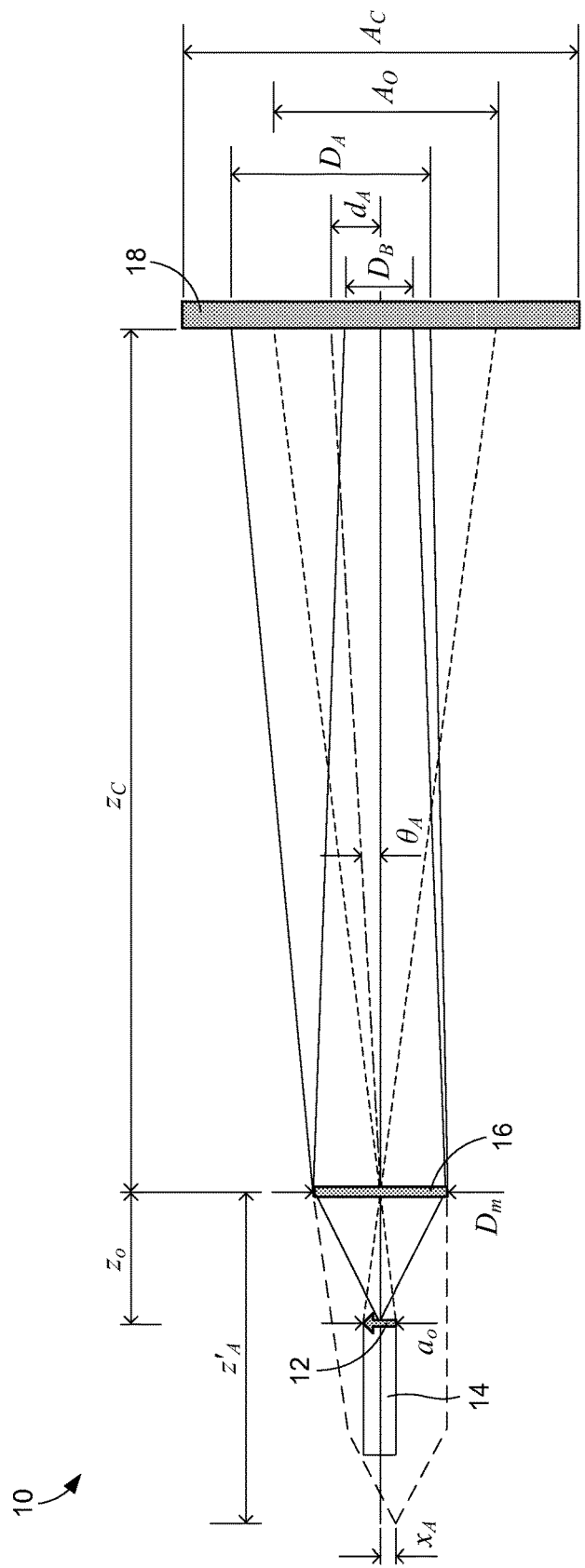
FIG. 1 is a schematic diagram of an embodiment of a self-interference incoherent digital holography system.
Figure 2A:
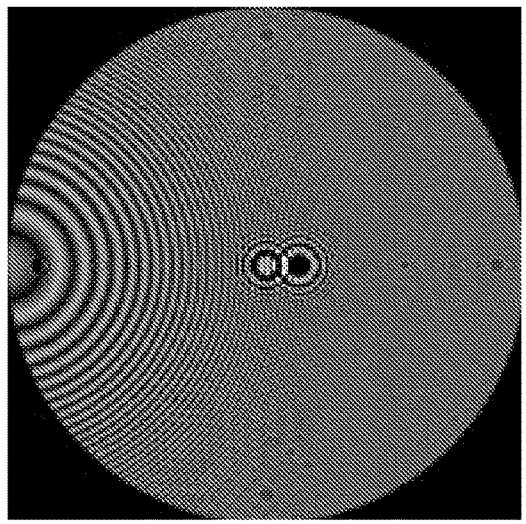
FIG. 2A shows Fresnel mask patterns of the diffractive filter.
Figure 2B:
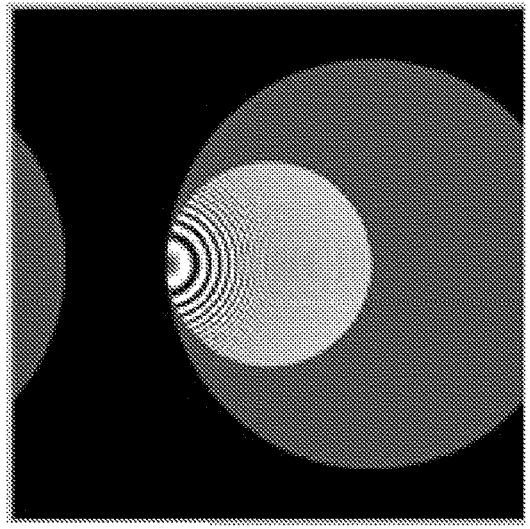
FIG. 2B shows an example of an interference pattern generated by the patterns of FIG. 2A.
Figure 2C:
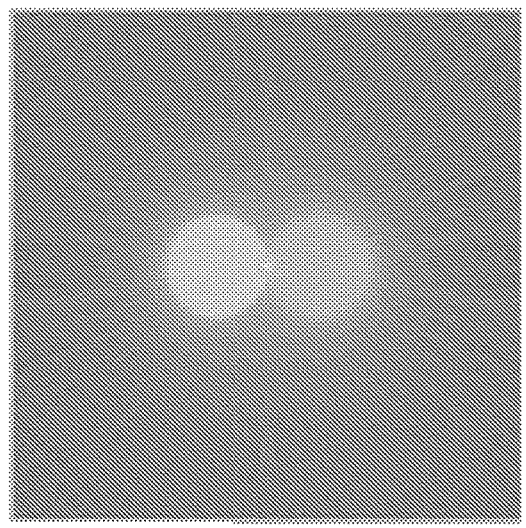
FIG. 2C shows an example of a Fourier spectrum of the interference pattern of FIG. 2B.
Figure 2D:
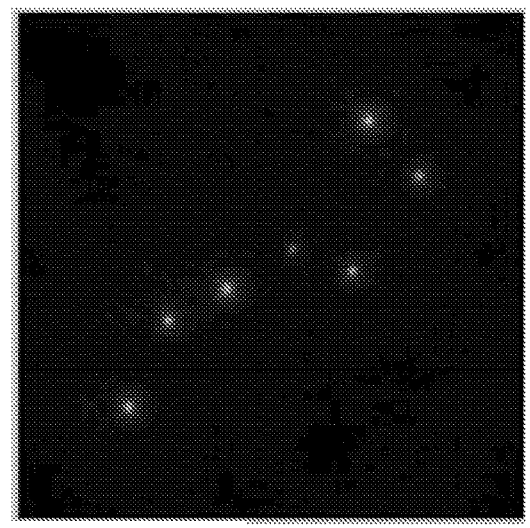
FIG. 2D shows a reconstruction of the observed object.

FIG. 1 illustrates an embodiment of a self-interference incoherent digital holography system 10. As shown in the figure, the system 10 can be used to generate a holographic image of an object 12. The object 12 is illuminated with incoherent light, which can be natural or artificial light. In embodiments in which the system 10 is integrated into a microscope, the light can be an incoherent beam 14 of light that is emitted from a light source (not shown) of the system and that is transmitted through the object 12. In embodiments in which the system 10 is integrated into a digital holographic telescope or camera, the light can be ambient light from the environment that is reflected by the object 12 or light emitted by the object. The light from the object 12 is delivered to a diffractive filter 16. The light then passes through the diffractive filter 16 and is received by a light sensor 18, such as a charge-coupled device (CCD).

The diffractive filter 16 is configured to generate holographic interference patterns on the image plane of the light sensor 18. In some embodiments, the diffractive filter 16 comprises two superposed Fresnel mask patterns that create the holographic interference. The mask patterns have different focal lengths and a slight relative tilt (i.e., angular offset). The mask patterns are designed to produce the holographic interference for optimal resolution and contrast of reconstructed holographic images. In some embodiments, the diffractive filter 16 is essentially a binarized superposition of two Fresnel lenses having different focal lengths and a relative tilt. A spherical wave scattered from each object point and transmitted through the filter 16 creates two copies of the spherical wave with slightly different curvatures. The two copies arriving at the image plane of the light sensor 18 are coherent because they are clones from the same object point, and therefore are capable of creating a Fresnel zone-type interference ring pattern whose center and frequency encode the lateral and axial positions of the object point. In some embodiments, the filter design incorporates the system (e.g., microscope, camera) parameters and therefore minimizes optical adjustment or alignment and optimizes performance.

FIG. 2 illustrates an example diffractive filter and its use. FIG. 2A shows the two superposed Fresnel mask patterns of the filter. FIG. 2B shows an example of an interference pattern generated by the mask patterns of FIG. 2A on the image plane of a light sensor, given a single point object. FIG. 2C shows an example of a Fourier spectrum of the interference pattern of FIG. 2B. FIG. 2D shows a reconstruction of a the observed object (the "Big Dipper").

The Fresnel mask patterns can be combined in various ways to create the diffractive filter. As a first method, the two binarized Fresnel lens patterns can be added together according to the following relation:

$$\Psi(x, y) = \left\{\cos\left[-\frac{\pi}{\lambda f_A}(x^2 + y^2) + \frac{2\pi x}{\lambda}\sin\theta_A\right] > 0\right\} \wedge$$
$$\left\{\cos\left[-\frac{\pi}{\lambda f_B}(x^2 - y^2) + \frac{2\pi x}{\lambda}\sin\theta_B\right] > 0\right\}$$

Figure 3:
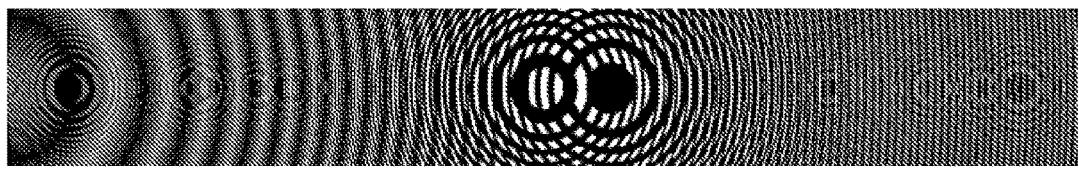
FIG. 3 shows an example diffractive filter having two binarized Fresnel mask patterns that were added together.

FIG. 3 shows an example diffractive filter having two binarized Fresnel lens patterns that were added together.

In a second example, two complex spherical wave fronts can be added together before binarizing according to the following relation:

$$\Psi(x, y) = \text{Re}\left\{\exp i\left[-\frac{\pi}{\lambda f_A}(x^2 + y^2) + \frac{2\pi x}{\lambda}\sin\theta_A\right] + \exp i\left[-\frac{\pi}{\lambda f_B}(x^2 + y^2) + \frac{2\pi x}{\lambda}\sin\theta_B\right]\right\} > 0$$

Figure 4:
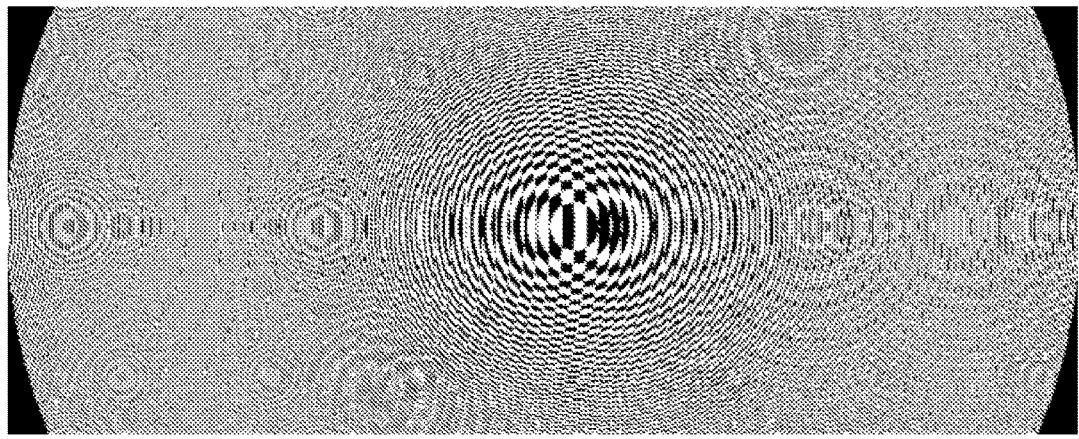
FIG. 4 shows an example diffractive filter having two complex spherical wave fronts that were added together before binarizing.

This second method may be preferable in some situations as it may provide greater diffraction efficiency. FIG. 4 shows an example of a diffractive filter having two complex spherical wave fronts that were added together before binarizing.

The various parameters of the incoherent digital holography system 10 can be designed to suit the particular application in which it is used. These parameters include:

$a_o$: object's lateral size
$D_m$: diameter of the diffractive filter
$\theta_A$: angular offset of the diffracted beam component A (component B's offset is assumed to be zero)
$A_c$: lateral size of the sensor plane
$D_A, D_B$: diameters of beam spots A and B on sensor plane
$d_A$: lateral shift of the beam spot A on sensor plane (beam spot B is assumed to be centered)
$x_A$: offset of a virtual image of the object center for component A; ($x_B$ is assumed to be zero)
$A_o$: geometric magnified size of the object on the sensor plane
$z'_A$: distance of the virtual image of the object
$z_o$: distance of the object from the diffractive filter
$z_c$: distance of the sensor plane from the diffractive filter
$\lambda$: wavelength
$l_c$: coherence length of the light source (e.g., microscopy application)
$N_c$: number of pixels of the sensor The focal length $f_A$ of the first Fresnel mask pattern ($f_B$ calculated using the similar equations) and the angular offset $\theta_A$ between the Fresnel mask patterns can be calculated using the following design equations:

$$D_A \rightarrow f_A$$
$$\frac{1}{z'_A} = \frac{1}{z_o} - \frac{1}{f_A};$$
$$D_A = D_m \frac{z'_A + z_c}{z'_A} \rightarrow f_A = \frac{z_c}{1 + \frac{z_c}{z_o} - \frac{D_A}{D_m}}$$
$$d_A \rightarrow \theta_A$$
$$d_A = f_A \sin\theta_A \frac{z_o + z_c}{z_o} \rightarrow \theta_A = \frac{d_A}{f_A\left[1 + \frac{z_c}{z_o}\right]}$$

As an example system design project, consider an x-ray microscopy application in which the following parameters are fixed by the physical constraints of the microscope:

$$\begin{cases} \lambda = 0.0015\,\mu m & a_o = 10\,\mu m & D_m = 50\,\mu m & A_c = 25000\,\mu m \\ l_c = 1\,\mu m & z_o = 1000\,\mu m & z_c = 2e6\,\mu m & N_c = 2000 \end{cases}$$

In such a case, the focal lengths and angular offset could be calculated as follows:

$$D_A = 20000 \rightarrow f_A = \frac{2e6}{1 + \frac{2e6}{1e3} - \frac{20000}{50}} = 1250$$

$$D_B = 10000 \rightarrow f_B = 1110$$

$$d_A = 5000 \rightarrow \theta_A = \frac{5000}{1250\left[1 + \frac{2e6}{1000}\right]} = 0.002$$

$$d_B = 0 \rightarrow \theta_B = 0$$

$$z'_A = \frac{f_A z_o}{f_A - z_o} = \frac{1250 \cdot 1000}{1250 - 1000} = 5000$$

-continued $$z'_B = \frac{1110 \cdot 1000}{1110 - 1000} = 10091$$

$$z_k = z_{AB} = -\frac{z_A z_B}{z_A - z_B} =$$

$$-\frac{(z'_A + z_c)(z'_B + z_c)}{(z'_A + z_c) - (z'_B + z_c)} = -\frac{(5000 + 2e6)(10091 + 2e6)}{(5000) - (10091)} = 7916e8$$

$$A_o = a_o \frac{z_c}{z_o} = 10 \frac{2e6}{1e3} = 20000$$

It is noted that when self-interference incoherent digital holography (SIDH) is extended to x-ray holography, the incoming x-ray beam illuminates the entire area of the diffractive filter, which improves the numerical aperture and system resolution as well as ensures low loss and high efficiency of photon flux. Furthermore, the x-ray beam has no requirement of spatial coherence across the object or the filter. This greatly simplifies the optical configurations to acquire holograms and diversifies the types of light sources that can be used.

SIDH-based x-ray holography may open a viable pathway to a host of new holographic techniques and applications. The optical configuration is very simple, efficient, and adaptable. Though incoherent, one can still obtain phase structure of an object, for x-ray phase contrast. Particularly, internal three-dimensional structures that are a hallmark of mesoscale science can be imaged using simple optics and straightforward numerical processing in important classes of materials, ranging from biological systems, to batteries, catalysis, and electronic and magnetic devices.

The invention claimed is:

1. A self-interference incoherent digital holography system comprising:
    a single light path along which incoherent light from an object to be holographically imaged travels;
    a light sensor positioned along the single light path; and
    a diffractive filter positioned along the single light path, the diffractive filter being configured to receive the incoherent light from the object and to generate holographic interference patterns on the sensor;
    wherein the system comprises no components that split the incoherent light into separate light paths.

2. The system of claim 1, wherein the light sensor is a charge-coupled device.

3. The system of claim 1, wherein the diffractive filter comprises two superposed Fresnel mask patterns.

4. The system of claim 3, wherein the Fresnel mask patterns have different focal lengths.

5. The system of claim 4, wherein the Fresnel mask patterns are angularly offset relative to each other.

6. The system of claim 1, wherein the system is implemented in a microscope.

7. The system of claim 1, wherein the system is implemented in a telescope.

8. The system of claim 1, wherein the system is implemented in a holographic camera.

9. A method for creating a holographic image of an object, the method comprising:
    receiving incoherent light from the object with a diffractive filter comprising superposed Fresnel mask patterns; and
    generating holographic interference pattern on a light sensor using the diffractive filter without having to split the received incoherent light into separate light paths.

10. The method of claim 9, wherein receiving incoherent light comprises receiving x-ray light.

11. The method of claim 9, wherein receiving incoherent light comprises receiving ambient light.

12. The method of claim 9, wherein the superposed Fresnel mask patterns have different focal lengths.

13. The method of claim 9, wherein the Fresnel mask patterns are angularly offset relative to each other.

14. The method of claim 9, further comprising reconstructing a holographic image of the object from the holographic interference pattern.

15. The method of claim 14, wherein reconstructing a holographic image comprises numerically processing the holographic interference pattern.

16. A self-interference incoherent digital holography system comprising:
    a single light path along which incoherent light from an object to be holographically imaged travels;
    a light sensor positioned along the single light path; and
    a diffractive filter positioned along the single light path, the diffractive filter comprising two superposed Fresnel mask patterns having different focal lengths and being angularly offset relative to each other, the diffractive filter being configured to receive the incoherent light from the object and to generate holographic interference patterns on the sensor;
    wherein the system comprises no components that split the incoherent light into separate light paths.

* * * * *